United States Patent
Haager et al.

(10) Patent No.: US 7,937,713 B2
(45) Date of Patent: May 3, 2011

(54) SYSTEM AND METHOD FOR PROVIDING SERVICES ON A DISTRIBUTED NETWORK

(75) Inventors: John C. Haager, Bonney Lake, WA (US); Mike R. Manzano, Seattle, WA (US)

(73) Assignee: Topia Technology, Tacoma, WA (US)

( * ) Notice: Subject to any disclaimer, the term of this patent is extended or adjusted under 35 U.S.C. 154(b) by 0 days.

(21) Appl. No.: 11/739,084

(22) Filed: Apr. 23, 2007

(65) Prior Publication Data

US 2007/0277180 A1    Nov. 29, 2007

Related U.S. Application Data

(60) Provisional application No. 60/745,354, filed on Apr. 21, 2006, provisional application No. 60/825,852, filed on Sep. 15, 2006.

(51) Int. Cl.
*G06F 9/44* (2006.01)
*G06F 15/16* (2006.01)

(52) U.S. Cl. ........................................ 719/317; 709/202

(58) Field of Classification Search .................. 719/310, 719/316, 317; 709/200, 201, 202
See application file for complete search history.

(56) References Cited

U.S. PATENT DOCUMENTS

| | | | | |
|---|---|---|---|---|
| 5,603,031 A * | 2/1997 | White et al. | | 719/317 |
| 5,768,506 A * | 6/1998 | Randell | | 709/202 |
| 5,826,020 A * | 10/1998 | Randell | | 709/202 |
| 6,065,039 A * | 5/2000 | Paciorek | | 709/202 |
| 6,233,601 B1 * | 5/2001 | Walsh | | 709/202 |
| 6,282,563 B1 | 8/2001 | Yamamoto et al. | | |
| 6,496,871 B1 * | 12/2002 | Jagannathan et al. | | 719/317 |
| 6,662,207 B2 * | 12/2003 | Kawamura et al. | | 709/202 |
| 6,668,271 B1 * | 12/2003 | Wolff | | 709/202 |
| 6,681,243 B1 * | 1/2004 | Putzolu et al. | | 709/202 |
| 6,691,151 B1 * | 2/2004 | Cheyer et al. | | 709/202 |
| 6,816,880 B1 * | 11/2004 | Strandberg et al. | | 709/202 |
| 6,851,115 B1 * | 2/2005 | Cheyer et al. | | 719/317 |
| 6,859,931 B1 * | 2/2005 | Cheyer et al. | | 719/317 |
| 7,016,966 B1 * | 3/2006 | Saulpaugh et al. | | 709/230 |
| 7,072,967 B1 * | 7/2006 | Saulpaugh et al. | | 709/229 |
| 7,082,604 B2 * | 7/2006 | Schneiderman | | 718/100 |
| 7,200,848 B1 * | 4/2007 | Slaughter et al. | | 719/317 |
| 7,254,608 B2 * | 8/2007 | Yeager et al. | | 709/203 |
| 7,440,992 B1 * | 10/2008 | McMahon et al. | | 709/202 |
| 2002/0052913 A1 * | 5/2002 | Yamada et al. | | 709/202 |
| 2002/0156641 A1 * | 10/2002 | Kitajima | | 705/1 |
| 2004/0006589 A1 * | 1/2004 | Maconi et al. | | 709/202 |
| 2004/0010590 A1 * | 1/2004 | Manzano | | 709/224 |
| 2004/0088347 A1 * | 5/2004 | Yeager et al. | | 709/202 |
| 2004/0205772 A1 * | 10/2004 | Uszok et al. | | 719/317 |
| 2004/0210910 A1 * | 10/2004 | Manzano | | 719/317 |
| 2006/0225064 A1 * | 10/2006 | Lee et al. | | 717/168 |
| 2009/0157796 A1 * | 6/2009 | McMahon et al. | | 709/202 |

* cited by examiner

*Primary Examiner* — Van H Nguyen
(74) *Attorney, Agent, or Firm* — P. G. Scott Born; Black Lowe & Graham PLLC

(57) ABSTRACT

A method implementable in an electronic system for enabling a runtime environment to provide a service to a mobile agent object includes providing a service interface characterizing a method for providing the service to the mobile agent object. A service-description interface operable to provide a description of the service is provided to the mobile agent object. In response to receiving a selection of the description from the mobile agent object, a service object operable to provide the service is instantiated.

5 Claims, 3 Drawing Sheets

US 7,937,713 B2

SYSTEM AND METHOD FOR PROVIDING SERVICES ON A DISTRIBUTED NETWORK

PRIORITY CLAIM

The present application claims priority from U.S. Provisional Application No. 60/745,354 filed Apr. 21, 2006 and U.S. Provisional Application No. 60/825,852 filed Sep. 15, 2006 which are herein incorporated by reference.

FIELD OF THE INVENTION

Embodiments of the present invention relate, generally, to a distributed computing environment wherein processes created in an object-oriented environment direct their own movement throughout a computer network, and, in particular, relate to the provision of services within host computing environments.

BACKGROUND OF THE INVENTION

The advent of computer networks has proliferated the use of distributed-computing environments. A distributed-computing environment is a type of computing wherein several computer platforms, i.e., different computers, coupled by a network, perform separate but related tasks, (called a process), that are directed in concert toward a single achievement. One example of such a process is the retrieval of all files in a network having the same pattern of letters in the file name. By taking advantage of the computing power of several computers at once, tasks require less time for completion. Use of a processor close to resources to be processed reduces total computing resource requirements.

One method known in the art for practicing a distributed-computing environment is called "remote programming." In remote programming, a first executing program, called a client process, executing on a first computer system, sends to a second process, called a server process executing on the second computer system, a list of instructions. The instructions are then carried out on the second computer system by the server process, effectuating the goal of the client process. The instructions which the server process is designed to carry out must have some degree of generality, i.e., the instructions must allow some degree of local decision-making with respect to details.

Additionally, object-oriented programming has become one of many familiar models designers and programmers utilize to implement functionality within computer systems. The object model generally is defined by a class structure that includes class members providing both methods and associated data elements belonging to the class. The class members thus provide/define desired functionality within a computer program, wherein an object is declared as an instance of a particular class. As is commonplace, objects often must exchange data and/or invoke other objects operating on the same platform and/or communicate with objects belonging to remote platforms. In order to communicate between objects, interface systems and standards have been developed to define how objects may communicate and/or interact with one another.

There exist systems based on principles of remote and/or object oriented programming that utilize processes called mobile agents (sometimes referred to as mobile objects or agent objects). Such a system may provide the ability for an object (the mobile agent object), existing on a first ("host") computer system, to transplant itself to a second ("remote host") computer system while preserving its current execution state. The operation of a mobile agent object is described briefly below.

The instructions of the mobile agent object, its preserved execution state, and other objects owned by the mobile agent object are packaged, or "encoded", to generate a string of data that is configured so that the string of data can be transported by all standard means of communication over a computer network. Once transported to the remote host, the string of data is decoded to generate a computer process, still called the mobile agent object, within the remote host system. The decoded mobile agent object includes those objects encoded as described above and remains in its preserved execution state. The remote host computer system resumes execution of the mobile agent object which is now operating in the remote host environment.

While now operating in the new environment, the instructions of the mobile agent object are executed by the remote host to perform operations including extracting, defining, creating, and manipulating data objects and interacting with other remote host computer objects. Such operations are often called services.

One problem associated with systems that host mobile objects results from the requirement that such objects have knowledge of the particular characteristics of the host system in order to receive services. If the host system's characteristics should change, the mobile object's knowledge becomes useless. For example, in some prior-art systems, a mobile object, in order to receive a particular service from a host system, must have a priori knowledge of register addresses associated with such service. If these addresses should ever change (as is commonly the case), the mobile object must be reconfigured to receive the service.

Other problems with the prior art not described above can also be overcome using the teachings of embodiments of the present invention, as would be readily apparent to one of ordinary skill in the art after reading this disclosure.

SUMMARY OF THE INVENTION

In an embodiment of the invention, a method implementable in an electronic system for enabling a runtime environment to provide a service to a mobile agent object includes providing a service interface characterizing a method for providing the service to the mobile agent object. A service-description interface operable to provide a description of the service is provided to the mobile agent object. In response to receiving a selection of the description from the mobile agent object, a service object operable to provide the service is instantiated.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
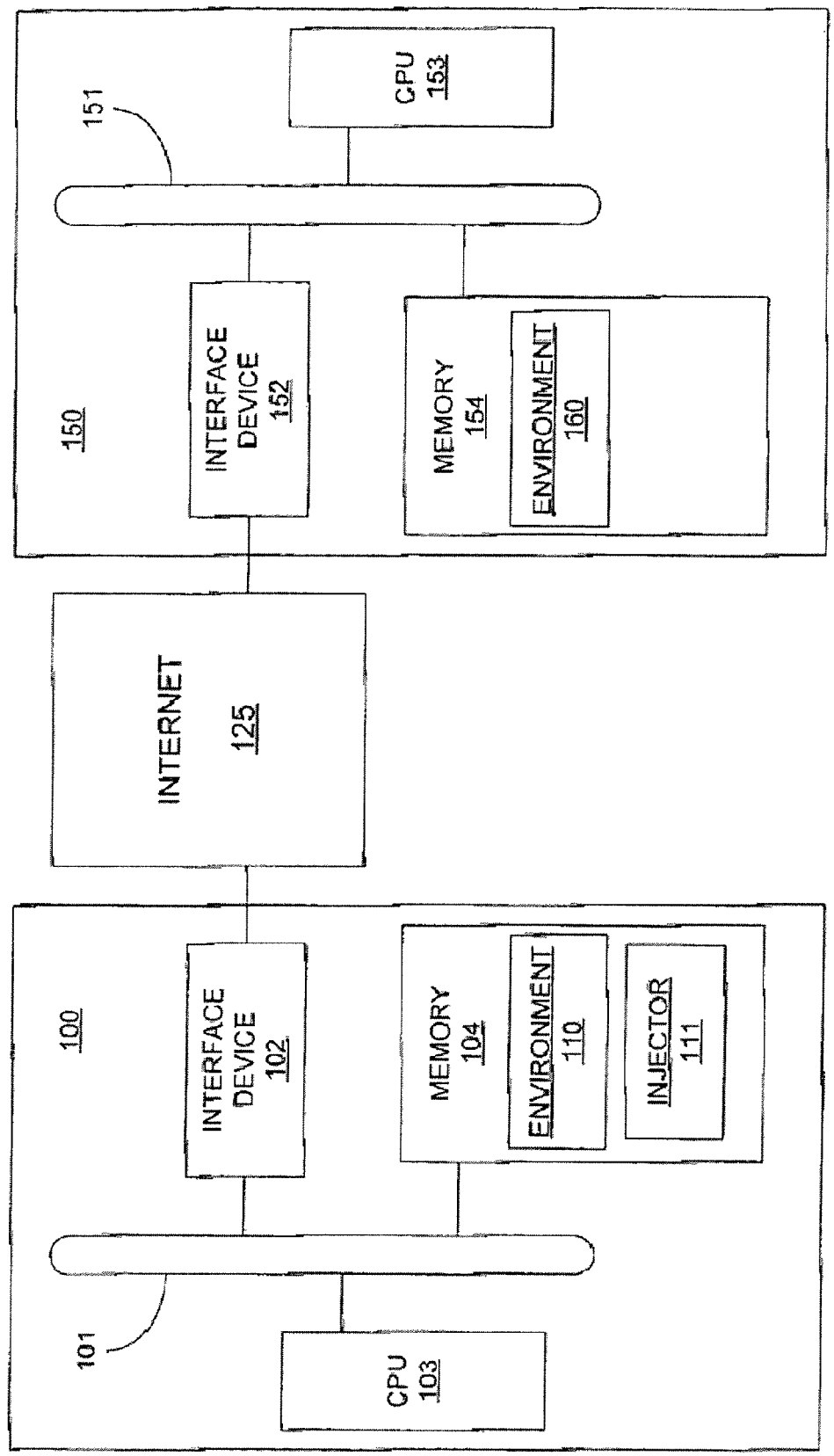
FIG. 1 is a schematic view of an exemplary operating environment in which an embodiment of the invention can be implemented.

Embodiments of the invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Computing or other electronic devices described herein typically include at least some form of computer readable media. Computer readable media can be any available media that can be accessed by such computing devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing devices. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

An embodiment of the invention leverages remote programming concepts by utilizing processes called mobile agents (sometimes referred to as mobile objects or agent objects). Generally speaking, these concepts provide the ability for an object (the mobile agent object) existing on a first ("host") computer system to transplant itself to a second ("remote host") computer system while preserving its current execution state. The operation of a mobile agent object is described briefly below.

The instructions of the mobile agent object, its preserved execution state, and other objects owned by the mobile agent object are packaged, or "encoded," to generate a string of data that is configured so that the string of data can be transported by all standard means of communication over a computer network. Once transported to the remote host, the string of data is decoded to generate a computer process, still called the mobile agent object, within the remote host system. The decoded mobile agent object includes those objects encoded as described above and remains in its preserved execution state. The remote host computer system resumes execution of the mobile agent object which is now operating in the remote host environment.

While now operating in the new environment, the instructions of the mobile agent object are executed by the remote host to perform operations of any complexity, including defining, creating, and manipulating data objects and interacting with other remote host computer objects.

FIG. 1 is a block diagram of a distributed-computing environment suitable for practicing embodiments of the invention. The distributed-computing environment includes a first computer system 100 and a second computer system 150 that are coupled by a network connection, such as the internet 125 as shown in FIG. 1. The network connection may be any other connection, such as a Local Area Network (LAN) for example, that is suitable for facilitating communication between computer systems. Here, the first 100 and second 150 computer systems may communicate over the internet 125 using a standard protocol, such as, for example, Transmission Control Protocol/Internet Protocol (TCP/IP). Additionally, there are typically many more computer systems (not shown) coupled with the internet 125, all of which may communicate with other computers on the network including the first and second computers 100 and 150.

The first computer system 100 includes a CPU 103 coupled to a bus 101 that facilitates communication between the CPU 103 and other components of the computer 100. Other components of the computer 100 include a Network Interface Component 102 (NIC) and a memory 104. The memory may include magnetic or optical disks, Random-Access memory (RAM), Read-Only memory (ROM), Basic Input/Output Systems (BIOS), or any other commonly known memory system used in computer architecture. In the first computer 100, a mobile-agent runtime environment 110 and a mobile agent injector program 111 are resident within the memory 104. Although shown as separate memory components, the mobile-agent runtime environment 110 and a mobile agent injector program 111 may reside in a single memory component or in any combination of memory components that are coupled with the bus 101. The NIC 102 facilitates communications between the first computer 100 and other computers, such as the second computer 150, via the internet 125.

The second computer 150 is similar to the first computer 100 and includes a CPU 153, a bus 151, a NIC 152, and a memory 154 which includes a mobile-agent runtime environment 160. These components are organized and coupled as described above with respect the first computer 100.

The above-described distributed-computing environment may host one or more mobile agent objects (not shown) that are present in one of the mobile-agent runtime environments 110 or 160 of one of the computers 100 or 150. The mobile-agent runtime environment 110 and 160 is a portion of the memory dedicated to allowing a mobile agent object the ability to perform operations that it was programmed to carry out.

Mobile agent objects may be instantiated in a mobile-agent runtime environment 110 or 160 in several ways, two of which are briefly described here. In a first way, the mobile agent object is locally created in the first computer 100 and then locally injected into the mobile-agent runtime environment 110 by the mobile agent injector program 111. In a second way, the mobile agent object moves from the mobile-agent runtime environment 110 of the first computer system 100 to the mobile-agent runtime environment 160 of the second computer system 150 over the internet 125 by its own accord, i.e., according to its programmed instructions.

Figure 2:
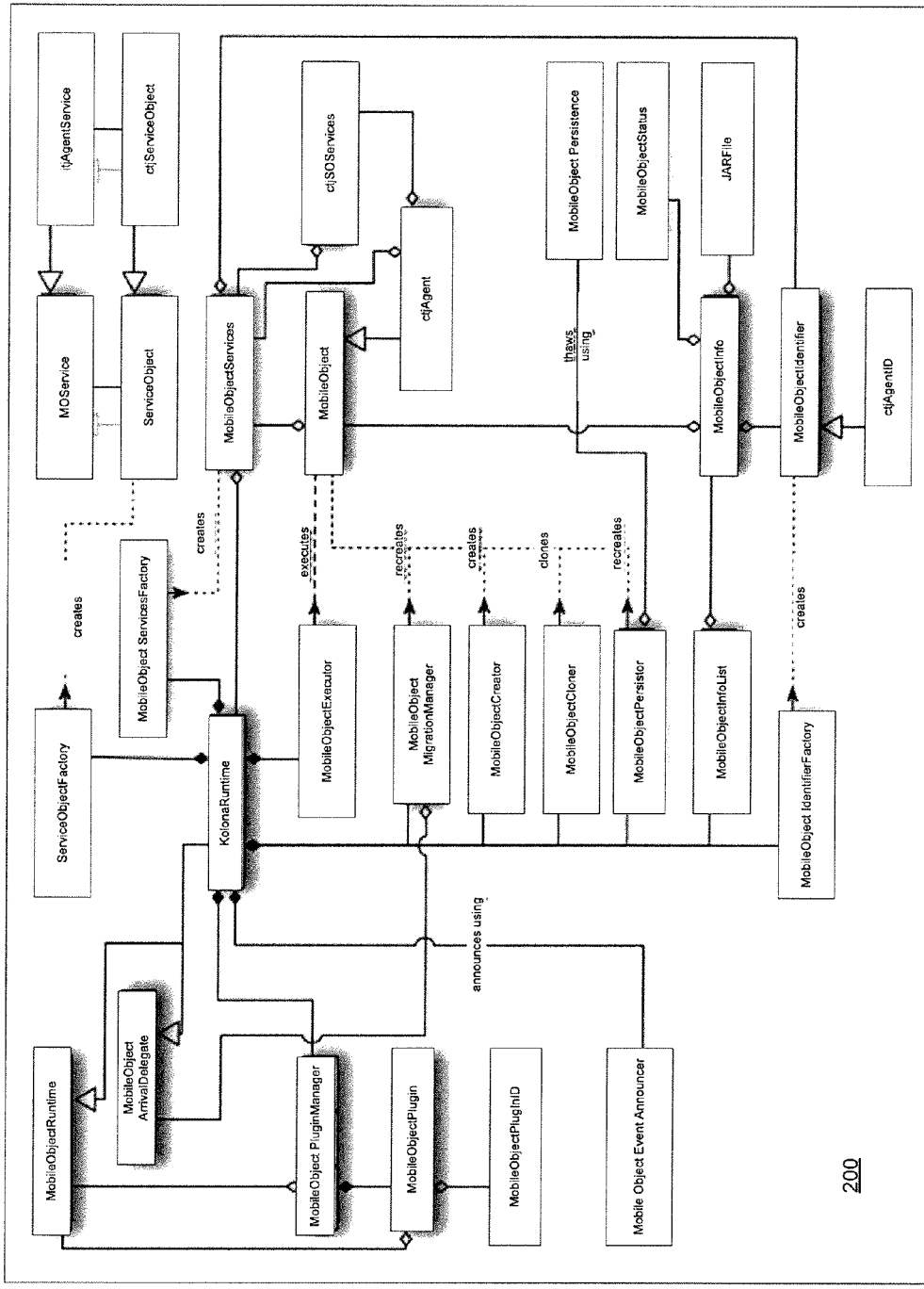
FIG. 2 is a block diagram of an exemplary runtime environment according to an embodiment of the invention.

FIG. 2 is a block diagram of a mobile-agent runtime environment 200 which may reside in any memory system of any computing environment, such as the mobile-agent runtime environment 110 of the memory 104 in the computer 100 shown in FIG. 1. The mobile-agent runtime environment 200 provides a platform for the mobile agent object wherein the mobile agent object is provided an interface for accessing services within the host-computing environment. The mobile-agent runtime environment 200 exists in a host-computing environment and may be aided by the operating system of the host computer system. Each feature of the environment 200 is discussed as follows:

MobileObjectRuntime

The MobileObjectRuntime defines the public interface to the runtime environment. It defines methods for:

creating a new MobileObject (discussed in greater detail below);

thawing out a suspended MobileObject; and/or adding, retrieving and/or updating Plugins.

KolonaRuntime

The KolonaRuntime extends the MobileObjectRuntime interface and/or defines the internal interface used by the rest of the environment 200. It defines methods for:

moving a MobileObject to another runtime;

cloning a MobileObject; and/or locating a MobileObject by its MobileObjectIdentifier.

In addition, the KolonaRuntime extends the MobileObjectArrivalDelegate interface used by the MobileObjectMigrationManager whenever a MobileObject is received from a remote runtime.

As shown in FIG. 2, the concrete class implementing this interface can serve as the hub of the environment 200. All the test of the components can either belong to or use the KolonaRuntime. Specifically, the KolonaRuntime can own the concrete classes implementing the following interfaces:

MobileObjectExecutor
MobileObjectCreator
MobileObjectCloner
MobileObjectPersistor
MobileObjectMigrationManager
ServiceObjectFactory
MobileObjectPluginManager
MobileObjectInfoList
MobileObjectIDFactory
MobileObjectEventAnnouncer.
MobileObjectCreator The MobileObjectCreator interface defines a single method that creates a new MobileObject based on a specified type. The implementor of this interface may be responsible for locating the class represented by the type and instantiating an instance of it. Any security checks or permissions that need to be setup on the loaded class may be accomplished by the implementor in a transparent fashion.

If a MobileObject of the specified type cannot be created, whether because it cannot be found, or because of some security or permission exception, an exception can be thrown.

MobileObjectCloner

The MobileObjectCloner interface defines a single method that takes a MobileObject and creates a new MobileObject that may be an exact clone of the original. The implementor of this interface may be responsible for performing any security checks or permission assignment to the cloned MobileObject in a transparent fashion.

If the MobileObject cannot be cloned for any reason, an exception may be thrown.

MobileObjectPersistor

The MobileObjectPersistor interface defines two methods, one for persisting a MobileObject and one for retrieving a MobileObject that has been previously persisted. The persist method takes a reference to the MobileObject and its MobileObjectIdentifier. The retrieve method takes a MobileObjectIdentifier and returns a MobileObject. The retrieve method may be responsible for doing any security checks and/or permission assignment to the reconstructed MobileObject.

If the persist method fails to successfully persist the MobileObject, it throws an exception. If the retrieve method fails to recreate the MobileObject, it throws an exception.

MobileObjectPersistence

The MobileObjectPersistence interface defines two methods for persisting and/or retrieving binary data keyed by a String value. The persist method takes a String that serves as the key, and a byte[ ] containing the data to be persisted. It may be an error to pass in null for the byte[ ]. Doing so can result in a NullPointerException. The retrieve method takes a String that serves as the key and returns a byte[ ] containing the data stored under the key. If no data is stored under the specified key, null may be returned.

MobileObjectMigrationManager

The MobileObjectMigrationManager interface defines two methods, one for migrating a MobileObject to another runtime, and one for setting the Arrival Delegate. The implementer of this interface may be responsible for both sides of the migration protocol, both sending and receiving MobileObjects.

When the migrate method is called, the implementer connects to the destination system, negotiates the transfer of the MobileObject to the remote runtime, and waits for confirmation that the MobileObject was accepted by and successfully restarted on the remote runtime. If the transfer of the MobileObject fails for any reason, an exception may be thrown.

When the implementer receives a MobileObject, it reconstitutes it, performing any necessary security checks and/or permission assignments. The arriving MobileObject may be then passed to the MobileObjectArrivalDelegate. If the arriving MobileObject cannot be accepted, either because classes don't exist and/or can't be transferred, or because of a security violation, the transfer may be failed, and nothing may be passed to the MobileObjectArrivalDelegate.

MobileObjectArrivalDelegate

The MobileObjectArrivalDelegate interface defines a single method that may be called when a new MobileObject arrives from a remote runtime. This method has a single parameter that may be the MobileObject that arrived from the remote system.

MobileObjectExecutor

The MobileObjectExecutor interface defines a single method for executing a MobileObject. It takes three parameters, a reference to the MobileObject to be executed, the status of the MobileObject (i.e. Created, Arriving, Thawing, Cloned), and Object[ ] containing the parameters to be passed to the Created( ) method of the MobileObject.

The implementor of this interface may be responsible for creating an execution thread for this MobileObject and starting execution of the MO. It may be assumed that the MobileObjectServices and/or MobileObjectIdentifier have already been assigned to the MobileObject before being passed to the MobileObjectExecutor.

MobileObjectIdentifierFactory

The MobileObjectIdentifierFactory interface defines a single method that returns a new MobileObjectIdentifier.

MobileObjectIdentifier

The MobileObjectIdentifier interface may be used to identify a class that can act as a unique identifier. Any class implementing this interface may be used to identify a MobileObject. However, class implementing this interface may require fulfilling three requirements:

instances must be comparable with each other;

two instances that represent the same ID must be equal to each other;

the class must define a toString( ) method that returns a String representation of the ID that follows the previous two requirements.

MobileObjectServicesFactory

The MobileObjectServicesFactory interface defines a single method for obtaining a MobileObjectServices instance.

MobileObjectEventAnnouncer

The MobileObjectEventAnnouncer interface defines methods for announcing lifecycle events have occur to the MobileObjects. It defines methods for all the standard events such as Creation, Migration, Suspension, Thawing, and/or Cloning, along with other events such as access to Services, and/or the loading and/or unloading of Plugins.

MobileObjectInfoList

The MobileObjectInfoList interface defines the interface for storing, accessing and/or removing MobileObjectInfo objects. It defines standard add, retrieve, update, and/or delete methods.

MobileObjectInfo

The MobileObjectInfo interface defines a container that holds 4 pieces of information:

a reference to the MobileObject it represents;

a MobileObjectStatus representing the current state of the MobileObject;

a reference to the MobileObjectIdentifier;

a reference to the Jar File from which the MobileObject was loaded. If the MobileObject was not loaded from a Jar File, this reference can be null.

MobileObjectStatus

The MobileObjectStatus interface defines several constants that represent the various states a MobileObject can be in. These states include:

CREATED;
ARRIVED;
CLONED;
THAWED;
RUNNING.

JarFile

The JarFile interface represents the Jar File from which the MobileObject was loaded.

Mobile Object Architecture

This section describes the 2 classes that compose the Mobile Object portion of the Kolona MobileObject Runtime.

MobileObject

The MobileObject interface defines a class as being a mobile object. It defines 7 methods:

created

Called when the MobileObject may be first created.

arrived

Called whenever the MobileObject arrives on a new runtime.

thawed

Called whenever the MobileObject may be recreated from the persistence store.

cloned

Called when a MobileObject may be created by cloning another MobileObject.

run

Called after any of the lifecycle callbacks above. It defines the main runloop of the MobileObject. When the run method exits, the MobileObject terminates.

cleanup

Called whenever the MobileObject needs to be cleaned up. This can be called after a MobileObject has migrated off the current system, after it has been frozen in the persistence store, and/or after is has terminated.

setMOServies

Called by the runtime to set the MobileObjectServices instance to be used by this MobileObject.

MobileObjectServices

The MobileObjectServices interface defines the imperative actions that a MobileObject can take. These actions include migrating to another runtime, accessing the MobileObjectIdentifier assigned to the MobileObject, creating a clone of the MobileObject, obtaining and/or releasing service objects, and checkpointing the MobileObject to the persistence store.

The MobileObjectServices interface also defines accessors for setting up the MobileObjectIdentifier and/or the reference to the KolonaRuntime. Attempts to call these accessors by the MobileObject can result in SecurityExceptions being thrown.

Service Architecture

This section defines the 3 classes that make up the Services portion of the runtime environment 200.

ServiceObjectFactory

The ServiceObjectFactory interface defines two methods, one for obtaining a Service Object, and/or one for releasing the Service Object. The method for obtaining a Service Object takes a single parameter, a String representing the service type, and returns a reference to an object implementing Agent Service. The method for releasing a Service Object takes a reference to the service being released.

ServiceObject

The ServiceObject interface may be a marker interface implemented by any class that wishes to provide a service to a MobileObject. It defines a single method for unlocking and/or releasing the service. Any class implementing this interface can also implement an interface that extends the MOService interface.

MOService

The MOService interface may be a marker interface that identifies interfaces that may be implemented by ServiceObjects. In an embodiment, only service interfaces extending this interface may be made available to MobileObjects.

Plugin Architecture

This section describes the 3 interfaces involved in the plugin architecture.

MobileObjectPluginManager

The MobileObjectPluginManager interface defines methods for loading, retrieving, and/or unloading plugins. Each loaded plugin may be assigned an ID that may be used to retrieve a reference to the plugin and to unload the plugin. If a plugin fails to load, an exception may be thrown. If an attempt is made to retrieve a plugin that does not exist, an exception may be thrown. If an attempt is made to unload a plugin that does not exist, an exception may be thrown.

MobileObjectPlugin

The MobileObjectPlugin interface defines the methods needed for initializing and/or shutting down a plugin. Upon initialization, the plugin may be given a reference to the MobileObjectRuntime in which it is running.

MobileObjectPluginID

The MobileObjectPluginID interface represents any object that can be used to uniquely identify a plugin.

Figure 3:
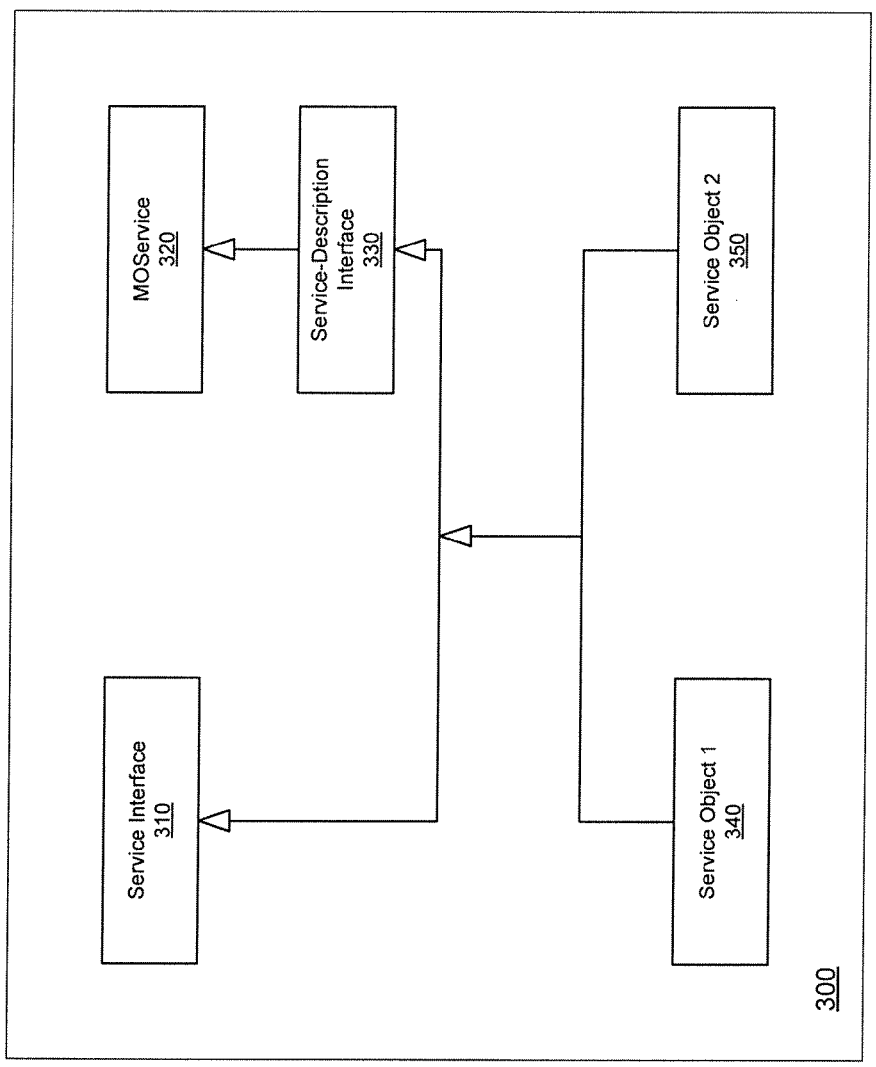
FIG. 3 is a functional block diagram of an exemplary runtime environment according to an embodiment of the invention.

FIG. 3 is a functional block diagram illustrating functionality of a runtime environment 300 according to principles of embodiments of the present invention. The runtime environment 300 may include some or all of the features of the runtime environment 200 described above.

In the illustrated embodiment, the environment 300 includes a service interface 310 that may incorporate all or some of the features associated with the ServiceObject interface described with reference to FIG. 2. The service interface 310 functions to characterize an implementation method for providing a service to a mobile agent object (not shown). For example, the service interface 310 may be operable to provide the exact ordering of executable instructions to carry out the particular service.

In the illustrated embodiment, the environment 300 further includes a service-description interface 330. The service-description interface 330 functions to provide a description of a service to the mobile agent object. The mobile agent object may thereafter elect to receive the described service.

Upon selection by a mobile agent object of the service description provided by the service-description interface 330, the environment 300 may instantiate a service object 340 to provide a first service implementation. Subsequently, in response to selection of the same service description by the same mobile agent object, the environment 300 may instantiate a service object 350 to provide a second service implementation.

For example, if the mobile agent object requests a service indicating the time of day, the service object 340 may provide the time accurate to the nearest second. Having received the desired service, the mobile agent object may then migrate out of the environment 300. In an embodiment, the same mobile agent object may subsequently return to the environment 300 to request the service indicating the time of day. In the meantime, operations employing assets of the environment 300 may have dictated providing more accurate atomic-clock based time readings as part of the time service. Accordingly, in response to the second and subsequent request for time service by the mobile agent object, the service object 350 may provide the time accurate to the nearest $1/1000^{th}$ of a second.

In an alternative embodiment, the subsequent/second service selection of the same service description may be received from a modified version of the original, rather than the same, mobile agent object. Still alternatively, the service object 350 may comprise a modified version of the service object 340.

In the illustrated embodiment, the environment 300 further includes a mobile-object-service interface 320 that may incorporate all or some of the features associated with the MOService interface described with reference to FIG. 2. The mobile-object-service interface 320 may function to identify the service object 340, 350 as a service-type object (as opposed to, for example, a mobile agent object).

Principles of service discovery and interaction between mobile agent objects and service objects that apply to the concepts herein are discussed in greater detail in commonly owned U.S. Pat. App. Pub. No. 20040010590 entitled "System and method for the discovery and usage of local resources by a mobile agent object" which is hereby incorporated by reference as if fully set forth herein.

Each of the processes, systems and/or methods described herein is implementable in any suitable hardware, software, firmware, or combination thereof. To the extent such processes, systems and methods are implemented in computer-executable instructions, an embodiment of the invention includes the transfer of such instructions over a medium from one electronic device to at least one other electronic device.

While a preferred embodiment of the invention has been illustrated and described, as noted above, many changes can be made without departing from the spirit and scope of the invention. Instead, the invention should be determined entirely by reference to the claims that follow.

The embodiments of the invention in which an exclusive property or privilege is claimed are defined as follows:

1. A computer-readable storage medium having stored thereon executable instructions to provide a runtime environment including a mobile-object-service interface, the runtime environment being configured to:

receive from a first mobile agent object a first selection of a first service description, the first selection provided by the first mobile agent object;

in response to receiving the first selection, provide a first service object that provides a first service associated with the first service description;

receive from one of the first mobile agent object and a second mobile agent object a second selection of the first service description, the second selection provided by the one of the first mobile agent object and the second mobile object; and in response to receiving the second selection, provide a second service object that provides a second service associated with the first service description, wherein the mobile-object-service interface identifies the first service object and second service object as service-type objects, wherein the first selection is received from an original version of the first mobile agent object; and wherein the second selection is received from a modified version of the first mobile agent object.

2. The medium of claim 1 wherein the second service object comprises a modified version of the first service object.

3. A computer-readable storage medium having stored thereon executable instructions to provide a runtime environment including a mobile-object-service interface, the mobile-object-service interface is configured to:

receive from a mobile agent object a first selection of a first service description, the first selection provided by the mobile agent object;

in response to receiving the first selection, provide a first service object, wherein the first service object provides a first service implementation to the mobile agent object;

receive from the mobile agent object a second selection of the first service description, the second selection provided by the mobile agent object; and in response to receiving the second selection, provide a second service object wherein the second service object provides a second service implementation to the mobile agent object, wherein the mobile-object-service interface identifies the first service object and second service object as service-type objects, wherein the first selection is received from an original version of the mobile agent object, and wherein the second selection is received from a modified version of the mobile agent object.

4. A method implemented in an electronic system for enabling a runtime environment including a mobile-object-service interface to provide at least one service to mobile agent objects, the method comprising:

receiving from a first mobile agent object a first selection of a first service description, the first selection provided by the first mobile agent object;

in response to receiving the first selection, providing a first service object that provides a first service associated with the first service description;

receiving from one of the first mobile agent object and a second mobile agent object a second selection of the first service description, the second selection provided by the one of the first mobile agent object and the second mobile object; and in response to receiving the second selection, providing a second service object that provides a second service associated with the first service description, wherein the mobile-object-service interface identifies the first service object and second service object as service-type objects,
wherein the first selection is received from an original version of the first mobile agent object; and
wherein the second selection is received from a modified version of the first mobile agent object.

5. A computer-readable storage medium having stored thereon executable instructions to provide a runtime environment including a mobile-object-service interface, the runtime environment being configured to:
receive from a first mobile agent object a first selection of a first service description, the first selection provided by the first mobile agent object;
in response to receiving the first selection, provide a first service object that provides a first service associated with the first service description;
receive from one of the first mobile agent object and a second mobile agent object a second selection of the first service description, the second selection provided by the one of the first mobile agent object and the second mobile object; and
in response to receiving the second selection, provide a second service object that provides a second service associated with the first service description,
wherein the mobile-object-service interface identifies the first service object and second service object as service-type objects, and
wherein the first and second selections are received from the same mobile agent object.

* * * * *